United States Patent [19]
Gellhaus et al.

[11] Patent Number: 6,034,949
[45] Date of Patent: Mar. 7, 2000

[54] EVALUATION MEANS FOR A MESSAGE-ORIENTED LAYER-3 COMMUNICATION

[75] Inventors: Christoph Gellhaus, Witten; Mauricio Silva, Dortmund; Ulrich Leimkoetter, Gelsenkirchen, all of Germany

[73] Assignee: Siemens Aktiengesellschaft, Munich, Germany

[21] Appl. No.: 08/790,428

[22] Filed: Jan. 29, 1997

[30] Foreign Application Priority Data

Jan. 31, 1996 [DE] Germany .................. 196 03 475

[51] Int. Cl.⁷ .................................................. H04Q 1/00
[52] U.S. Cl. ........................ 370/252; 370/466; 709/230
[58] Field of Search ..................... 370/252, 466, 370/467, 469, 465, 903; 395/200.54, 200.6; 379/15, 112, 165; 455/560, 403, 422, 15, 73, 550; 1/1; 709/230

[56] References Cited

U.S. PATENT DOCUMENTS

| | | | |
|---|---|---|---|
| 5,471,471 | 11/1995 | Freeburg et al. | 370/466 X |
| 5,497,396 | 3/1996 | Delprat | 370/466 X |
| 5,530,434 | 6/1996 | Kanda | 370/466 X |
| 5,598,412 | 1/1997 | Griffith et al. | 455/560 X |
| 5,612,990 | 3/1997 | Meier et al. | 370/467 X |
| 5,655,001 | 8/1997 | Cline et al. | 370/467 X |
| 5,664,004 | 9/1997 | Durchman et al. | 370/469 X |
| 5,717,737 | 2/1998 | Doviak et al. | 455/403 |
| 5,734,832 | 3/1998 | Tanger et al. | 395/200.54 |
| 5,740,374 | 4/1998 | Raffali-Schreinemachers | 395/200.6 X |
| 5,761,204 | 6/1998 | Grob et al. | 370/467 |
| 5,764,644 | 6/1998 | Miska et al. | 370/465 |
| 5,802,465 | 9/1998 | Hamalainen et al. | 455/403 |
| 5,854,978 | 12/1998 | Heidari | 455/403 X |
| 5,878,036 | 3/1999 | Spartz et al. | 455/560 X |

FOREIGN PATENT DOCUMENTS

| | | |
|---|---|---|
| 2 730 889 A1 | 8/1996 | France . |
| WO 97/10684 | 3/1997 | WIPO . |

OTHER PUBLICATIONS

Proceedings of the Nordic Seminar on Digital Land Mobile Radio Communications, Jun. 26, 1990, Seminar No. 4, (XP 000515553) Andrew Bud, System & Network Aspects of DECT, pp. 6.3 1–12.

IEEE, Countdown of the New Millennium, vol. 2 of 3, Dec. 2, 1991, XP 000332895, K. Masumikitagawa et al, An Advanced Air Interface For Integrated Digital Mobile Communications Systems, pp. 1474–1479.

Nachrichtentech Elektron, vol. 42, No. 1, (1992), Ulrich Pilger, Struktur des DECT–Standards, pp. 23–29, Jan./Feb. 1992.

*Primary Examiner*—Brian Zimmerman
*Attorney, Agent, or Firm*—Hill & Simpson

[57] ABSTRACT

Program-controlled evaluation device for a message-oriented layer-3 communication between a communication switching installation and a peripheral installation of a communication device, using a first protocol, as well as for a message-oriented layer-3 communication between the communication switching installation and a terminal apparatus, using a second protocol via the peripheral installation. The first and the second protocol consist of function blocks (ADM, MAIN, TEST, REST, LINK, BCAST, LCE, MM, CC) identified through protocol discriminators. Each protocol message of the first and of the second protocol contains a protocol discriminator indicator. The evaluation device has a single main sequence control for function block-specific, table-controlled evaluation of the first and of the second protocol, using a protocol discriminator-dependent branching. As a peripheral installation, for example, a base station of a cellular communication device with wirelessly reachable terminal apparatus is provided. The evaluation device then serves for the layer-3 communication between a peripheral assembly of the communication switching installation and this base station, as well as a terminal apparatus that can be wirelessly connected via this base station.

19 Claims, 3 Drawing Sheets

EVALUATION MEANS FOR A MESSAGE-ORIENTED LAYER-3 COMMUNICATION

BACKGROUND OF THE INVENTION

The present invention relates to a program-controlled evaluation means for the evaluation of messages, for a message-oriented layer-3 communication between a communication switching installation and a peripheral installation of a communication device, using a first protocol, as well as for a message-oriented layer-3 communication between the communication switching installation and a terminal apparatus via this peripheral installation, using a second protocol. In particular, the present invention relates to an evaluation means for a message-oriented layer-3 communication between a peripheral assembly of a communication switching installation and a base station for the bidirectional conversion of wire-bound transmitted signals at the switching installation side and wirelessly transmitted signals at the terminal apparatus side. It is also for a layer-3 communication between this peripheral assembly of the communication switching installation and a terminal apparatus that can be wirelessly connected via this base station.

Program-controlled installations for a message-oriented layer-3 communication between communication switching installations and peripheral installations have a protocol-specific evaluation means (interpreter) for the evaluation of the messages of a protocol, with an extensive main sequence control provided for all messages of the protocol and with tables that contain information and pointers for subsequent tables, as well as with synthesis and analysis functions. If messages of another protocol are transmitted from the communication switching installation, via this peripheral installation, to another installation, such as, for example, a terminal apparatus, then they are evaluated using an evaluation means specific for this protocol, with a separate main sequence control.

Memory space in a memory installation is required for each table, each synthesis function and each analysis function of each protocol, and additionally for the sequence control in each evaluation means.

A protocol-specific main sequence control for an evaluation means, which control is supposed to evaluate the messages of a protocol that fulfills several functions, is fairly extensive and thus requires a great deal of memory space. Moreover, a large amount of time is required for the processing of such a sequence, which is particularly undesirable for real-time processes.

SUMMARY OF THE INVENTION

It is an object of the present invention to provide a program-controlled evaluation means for the table-controlled evaluation of messages for a message-oriented layer-3 communication between a communication switching installation and a peripheral installation of a communication device, using a first protocol. It is also an object to provide for a message-oriented layer-3 communication between the communication switching installation and a terminal apparatus via this peripheral installation, using a second protocol, whereby less memory space is required.

According to the present invention, the first and the second protocol are divided into function blocks respectively characterized by protocol discriminators. Each protocol message of the first and the second protocol contains a protocol discriminator indicator. In addition, a message type indicator, message element indicator and possible timer value indicators are provided. There is only a single main sequence control for the function block-specific evaluation of messages of the first and second protocol. The function block-specific evaluation is achieved by means of a branching in the main sequence control that is dependent on the protocol discriminator.

By partitioning the protocols into function blocks and by identification of these protocol components by means of protocol discriminators, analysis and synthesis functions can be used arbitrarily for the evaluation of all protocol components by using corresponding pointer references.

By the common use of a single main sequence control for both protocols, memory space for the control programs can be saved. By the table-controlled function block-specific evaluation, the length of the evaluation sequence is dynamically adapted to the message to be evaluated. As a result, computing time is saved.

If the first and the second protocol between the communication switching installation and the peripheral installation are nested, that is, if a message of the second protocol (for a communication between the communication switching installation and a terminal apparatus) is transmitted as a message element of a message of the first protocol (between the communication switching installation and the peripheral installation), the evaluation means evaluates this message according to the function block-specific protocol discriminator contained in this message for the first protocol by processing of the main sequence control. It obtains by this means as a message element the message according to the second protocol, and then evaluates this message according to the function block-specific protocol discriminator contained in the message for the second protocol by processing of the main process control. The length of the control sequence is also hereby dynamically adapted to the function.

If, in the case described above, the evaluation means is located in the peripheral installation, and the nested message is received from the communication switching installation, a protocol conversion ensues in the layers 2 and 1 for the layer-3 message, according to the second protocol, and a transmission to the terminal apparatus takes place.

The inventive evaluation means can be used in particular between a peripheral assembly of a communication switching installation and a base station, for the bidirectional conversion of wire-bound transmitted signals at the side of the switching installation, and wirelessly transmitted signals at the side of the terminal apparatus. Such communication switching installations can form cellular systems with such base stations, for example mobile radio systems or communication systems according to the European standard ETS 300 175, called DECT, (Digital European Cordless Telecommunications). The manner of functioning of an inventive evaluation means in such an application is discussed in further detail below.

In an advantageous embodiment of the present invention, the evaluation means for the table-controlled evaluation of messages has a protocol branching table, containing all protocol discriminators, as an entrance table. This table contains a pointer to a database table for each protocol discriminator. Each database table contains the setup of all messages of the protocol components associated with it. For this purpose, in particular pointers to specific other tables can be provided in a database table, for example, to timer value tables, message element tables and synthesis and/or analysis functions. In such a case, the tables and functions have a tree structure.

By means of a control structure with database tables, the maintenance, that is, the expansion or modification of the evaluation means, is made easier, since new messages can be processed through entries into a database.

The evaluation means preferably has a message element table that indicates for each message element whether or not it is necessary. Moreover, it can contain a message element function table with pointers to the analysis function and the synthesis function of the individual message elements. The arbitrary use of the individual functions in different messages is thereby possible.

In an advantageous further construction of this aspect of the invention, the message element table is constructed with several layers, and contains a message type table with a pointer to the information elements, concerning the message type, of an information element table. In this case, the information element tables are part of the message element table, and respectively indicate whether the information elements of the respective message type are necessary or optional. In this case, an information element function table is provided in place of the message element function table.

As mentioned above, each message preferably contains an information concerning one or several timer values. The structure of the evaluation means is hereby simplified if a timer value table with protocol-specific time values is provided, and if each database table contains a pointer to a corresponding time value of the timer value table By this means, different delay time values, waiting time values or evaluation speeds can be taken into account for different protocols and for different functions of one protocol, despite a single main sequence control. The indication of timer value information in each message enables the purposive adaptation of the evaluation means to the message to be evaluated.

It is to be learned from the preceding explanations that an inventive evaluation means requires little memory space, since the main sequence control is present only once. By means of an advantageous construction, the evaluation means can be easily maintained. Moreover, it offers a high synergy value, since existing functions can be used arbitrarily in all protocol components through pointer reference. In addition, an inventively structured evaluation means has good dynamic behavior, since the overall sequence of an evaluation itself ensues respectively in a single work string, given nested messages of different protocols.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
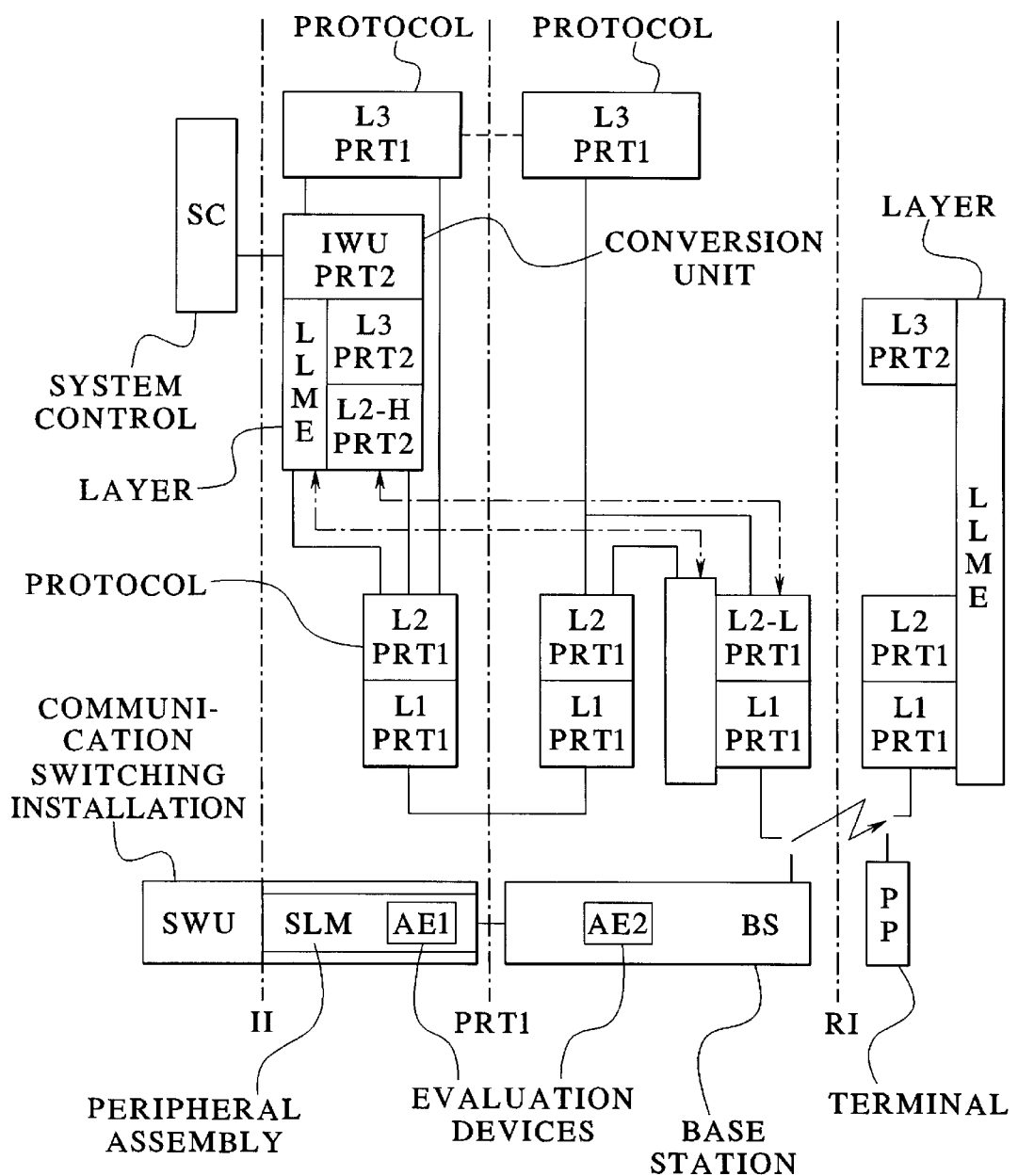
FIG. 1 is a schematic diagram depicting, components of a communication apparatus, and, allocated to these, the distribution of the layers 1, 2 and 3 of a line-bound protocol, and of a wireless protocol.

At the bottom of FIG. 1 there is shown, in a schematic diagram of a communication apparatus, a communication switching installation SWU with a peripheral assembly SLM. In addition, there is shown as a peripheral installation of the communication apparatus a base station BS for the conversion of wire-bound transmitted signals and wirelessly transmitted signals, as well as a portable communication terminal apparatus PP. The peripheral assembly SLM communicates with the system control SC of the communication switching installation SWU via an internal interface 11, for example using an ISDN protocol not shown in the representation. The communication between the peripheral assembly SLM and the base station BS ensues using a first protocol PRT1, provided for wire-bound transmission. A communication takes place between the base station and the wireless terminal apparatus PP via a radio interface RI, using a second protocol PRT2 provided for the radio transmission.

Both the peripheral assembly SLM and the base station BS, provided as a peripheral installation, respectively have an evaluation means AE1, AE2 for the evaluation of messages of the first and of the second protocol. Above the named schematic diagram, FIG. 1 shows, in vertical allocation, the protocol architecture for the represented wireless communication apparatus.

In the exemplary embodiment shown of a communication apparatus for wireless telephony, the second protocol corresponds to the DECT protocol or to the T-DECT protocol (transnational). The layer 2 of the DECT protocol is hereby partitioned into a lower portion L2-L PRT2 that lies in the base station BS and an upper part L2-H PRT2 that lies in the peripheral assembly SLM of the communication switching means SWU. The lower portion L2-L PRT2 of the layer 2 hereby contains among other things the functioning of the change of channel (bearer handover), given a set-up connection inside the same base station BS. The upper portion L2-H PRT2 of the layer 2 of the DECT protocol contains at least the function of the changeover of an existing connection from a base station BS to another base station (connection handover).

As can be seen in FIG. 1, at the side of the terminal apparatus the layers 1, 2 and 3, of the second protocol L1 PRT2, L2 PRT2, L3 PRT2, are located in the terminal apparatus PP and are coordinated via a steering unit for the lower layers LLME (low layer management entity).

In the stationary communication apparatus, formed by the communication switching installation SWU with its peripheral terminal groups SLM and by peripheral installations in the form of base stations BS, the layers 1 and 2 of the DECT protocol L1 PRT2, L2-L PRT2 lie in the base station, with the exception of the higher components L2-H PRT2 of layer 2 of the DECT standard, and the layer 3 L PRT2 of the DECT protocol lies in the communication switching installation SWU, in particular in the peripheral assembly SLM. Both in the peripheral installation BS and in the peripheral assembly SLM, they are coordinated by means of a steering unit for the lower layers LLME (low layer management entity).

The layers 1, 2 and 3 of the first protocol PRT1, provided for controlling the base station and for the setup of the radio path between the base station and the communication terminal device, are respectively located in the base station BS and in the peripheral assembly SLM.

The layer 3 L3 PRT2 of the second protocol PRT2 communicates with the layer 3 L3 PRT1 of the first protocol PRT1 via a conversion unit IWU PRT2 (interworking unit), as well as via the internal interface 11, using an additional protocol with the corresponding layer of the central control SC of the communication switching installation SWU.

The layer-3 messages of the second protocol PRT2 cannot be exchanged immediately between the terminal apparatus PP and the peripheral assembly SLM via the layers 2 and 1 of the second protocol L2 PRT2 and L1 PRT2, since no physical layer L1 PRT2 of the second protocol PRT2 is present between the peripheral assembly SLM and the peripheral installation BS. In practice, this means for example that no RF signals can be transmitted between the peripheral assembly SLM and the base station BS.

In the exemplary embodiment shown, the base station BS is connected with 64 kbit B-channels and with a D-channel, via a standard ISDN interface. Since different physical conditions accordingly hold on the wire path between the communication switching installation SWU and the BS station than on the air path between the base station BS and the terminal apparatus PP, a particularly structured layer-3 protocol architecture is required.

Figure 2:
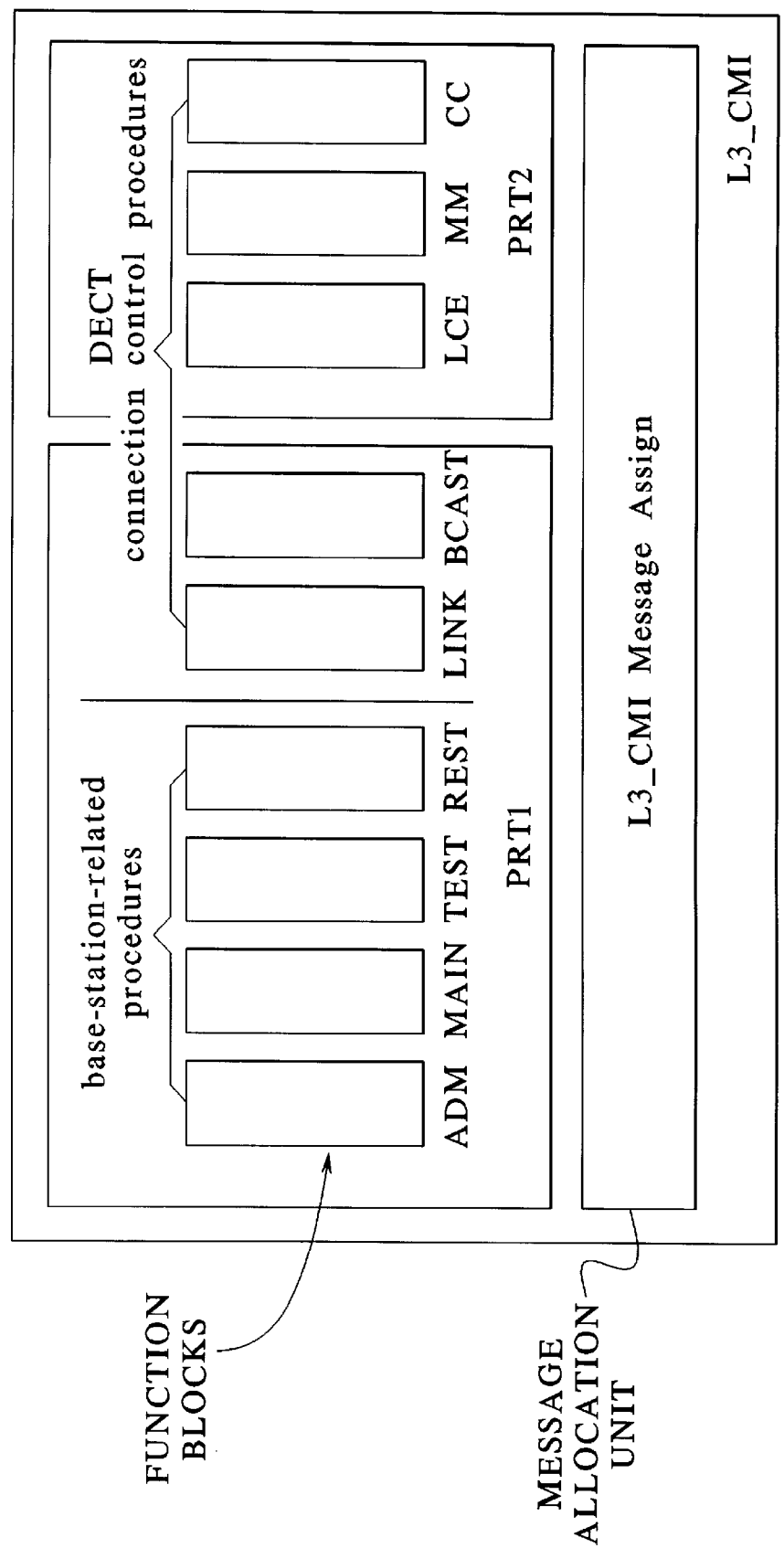
FIG. 2 depicts the software structure of the layer-3 process, a possible partitioning of the layer-3 wireless protocols of a communication apparatus shown in FIG. 1, with protocol discriminators allocated to the individual function blocks.

For the exemplary embodiment from FIG. 1, FIG. 2 shows the partitioning of the layer-3 wireless protocols PRT1 and PRT2 on the basis of the schematic diagram of the layer-3 process L3_CMI, dependent on the particular physical characteristics.

The protocols PRT1 and PRT2 are respectively partitioned into function blocks identified by a protocol discriminator ADM, MAIN, TEST, REST, LINK, BCAST, LCE, MM and CC. The protocol discriminators fulfill a distribution function, and are evaluated in a layer-3 message allocation unit "L3_CMI Message Assign" for the controlled calling of the protocol control corresponding to the allocated protocol function block. Within the layer-3 wireless protocol process L3_CMI, messages are delivered in order to be able to go from one protocol PRT1 into the other protocol PRT2. In this way, there result several parallel columns in the protocol control, namely the protocol function blocks shown in FIG. 2, with the reference characters ADM, MAIN, TEST, REST, LINK, BCAST, LCE, MM, CC, corresponding to their protocol discriminators. Inside the first protocol PRT1 there are the function blocks for administration ADM, for maintenance MAIN, for test purposes TEST and for the restart REST. In addition, function blocks required for the DECT connection control are provided for the connection LINK and for the non-specific distribution BCAST (broadcast). In the second protocol PRT2, thus in the DECT protocol in the exemplary embodiment, the following function blocks are provided: connection control CC, mobility management MM for the logging-on or, respectively, logging-off procedure, or location request, as well as a function LCE, responsible for the allocation of link references.

In principle, a protocol message of the layer-3 protocols PRT1, PRT2 is assembled from a protocol discriminator for the identification of the protocol, from an indication of the message type, from message elements, thus from the actual bearers of information, as well as from timer values, which are defined time values in the protocol traffic.

In the system explained on the basis of FIGS. 1 and 2, the base station BS is first commissioned by means of the following base station-related protocol portions: restart REST, maintenance MAIN and administration ADM. All messages thereby end inside the base station BS. If a connection to a portable terminal apparatus PP is to be set up, an over the air connection is first produced to this terminal device PP, using the components LCE designated as link control means. Data is then exchanged on this connection between the layer 3 of the second protocol L3 PRT2 in the peripheral assembly SLM and the layer 3 of the second protocol L3 PRT2 in the terminal apparatus PP. These layer-3 messages thereby represent a message element for the first protocol PRT1. The first protocol PRT1 and the second protocol PRT2 are consequently interleaved with one another between the peripheral assembly SLM and the base station BS.

Since the specified protocols are identical in their construction, in the base station BS and in the peripheral assembly SLM evaluation means AE2, AE1 are used that operate with all protocols with the same main sequence control. The particular characteristics of the individual protocols are stored in data tables, synthesis functions and analysis functions for the individual message elements.

For the processing of a message, this message is given over to the layer-3 process L3_CMI. There, the present protocol or, respectively, the corresponding protocol function block is determined on the basis of the protocol discriminator ADM, MAIN, TEST, REST, LINK, BCAST, LCE, MM or CC. In the evaluation that then follows, the message is examined for its message elements, and for each message element the corresponding analysis function is called. If a further message in another protocol is found inside a message element, this further message is recursively given over to the evaluation process, and the evaluation process starts again. The entire evaluation is hereby changed over to the other protocol by means of the new protocol discriminator. Analogously to this, in the transmission process a protocol is predetermined, and message elements are synthesized. If an element contains a message in another protocol, the process is also called again with the new protocol discriminator during the synthesis.

Figure 3:
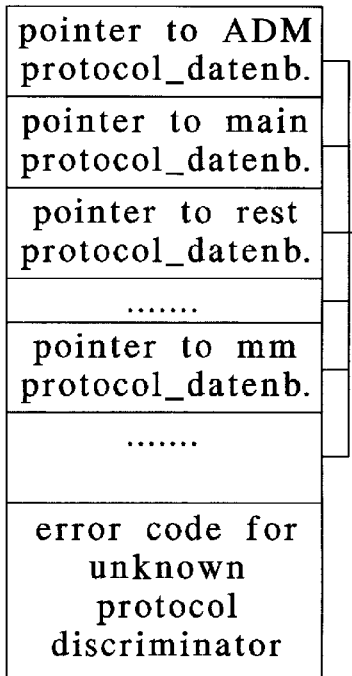
FIG. 3 depicts the data structures of the protocol databases on the basis of data tables, and their concatenation for the wireless layer-3 protocols.
Figure 3:
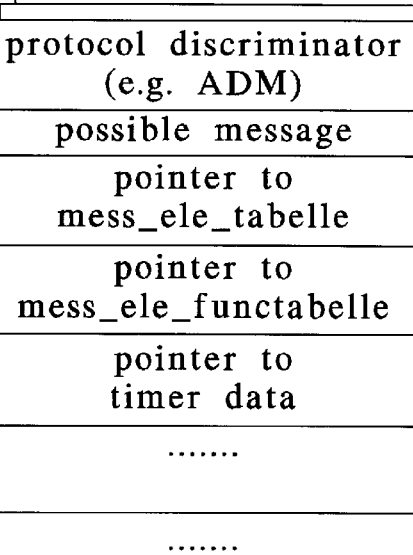
Figure 3:
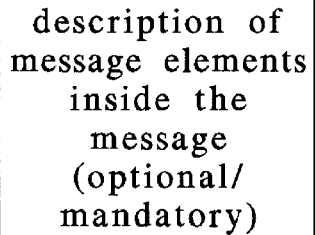
Figure 3:
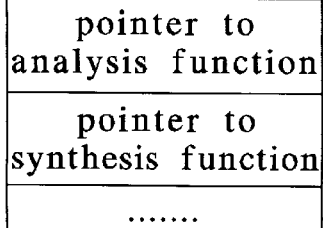
Figure 3:
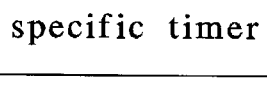

For the evaluation, the following data structures, shown in FIG. 3, apply:

1) An entrance table PROTOCOL_BRANCH, which contains all the protocol types corresponding to the protocol discriminators and has the pointers to the respective PROTOCOL_DATENBASIS.

2) For the specification of the respective setup of each possible message of a protocol, a multiplicity of PROTOCOL_DATENBASEN, in which there is per message type, the respective pointer to all relevant message elements.

3) Such message elements are contained in a table MESS_ELE, which specifies whether an element in the message is mandatory or optional.

4) Further message elements are specified in a table MESS_ELE_FUNC, which contains pointers to the analysis function and to the synthesis function.

5) Further message elements can be contained in the table of timer data, which contains protocol-specific timer values.

The layer-3 message allocation unit "L3_CMI Message Assign," shown in FIG. 3, is allocated to the entrance table PROTOCOL_BRANCH.

A PROTOCOL_DATENBASIS is respectively allocated to the protocol function blocks ADM, TEST, REST, LINK, BCAST, LCE, MM, NC, shown in FIG. 2.

By means of the partitioning shown in FIG. 3, it is possible to use the different elements, values and functions in different protocols through entry of the corresponding pointers into the respective tables.

The present invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A program-controlled evaluation system for a message-oriented layer-3 communication between a communication switching installation and a peripheral installation of a communication device, using a first protocol, and for a message-oriented layer-3 communication between the communication switching installation and a terminal apparatus, using a second protocol via the peripheral installation, comprising:
   each of the first and the second protocols having function blocks identified by protocol discriminators;
   the first and second protocols having protocol messages, each protocol message having a protocol discriminator indicator; and
   a single main sequence control of function block-specific, table-controlled evaluation of the first and of the second protocols using protocol discriminator-dependent branching.

2. The evaluation system according to claim 1, wherein the peripheral installation is a base station for bidirectional conversion of wire-bound transmitted signals at one side of the switching installation, and wirelessly transmitted signals at one side of the terminal apparatus, and wherein an evaluation system for the layer-3 communication is provided between a peripheral assembly of the communication switching installation and said base station, and a terminal apparatus that is wirelessly connectable via the base station.

3. The evaluation system according to claim 1, wherein the second protocol is a layer-3 protocol according to the Digital European Cordless Tele-communications standard ETS 300 175.

4. The evaluation system according to claim 1, wherein, when a message of the second protocol for a communication between the communication switching installation and the terminal apparatus is transmitted between the communication switching installation and the peripheral installation as a message element of the first protocol, the main sequence control is called first for evaluation of the message of the first protocol and is thereafter called for evaluation of the message of the second protocol.

5. The evaluation system according to claim 1, wherein the evaluation system further comprises a control installation and at least one memory installation for storing a main sequence control, for storing analysis and synthesis functions, for storing a protocol branching table containing all protocol discriminators as an entrance table, and for storing a database table for each protocol discriminator that respectively contains setup of all messages of an associated protocol function block, and to which there respectively points a pointer of the protocol branching table, in order to effect the protocol discriminator-dependent branching.

6. The evaluation system according to claim 5, wherein the memory installation has stored therein a message element table that indicates for each message element whether said message is mandatory or optional, said message a message element function table, which contains pointers to an analysis function and a synthesis function of individual message elements, and has stored therein a timer value table containing protocol-specific time values, whereby the individual database tables respectively contain pointers to message elements or, respectively, time values of the message element table, of the message element function table, and of the timer values table, which message elements or time values are required for each individual message setup.

7. The evaluation device according to claim 6, wherein the message element table comprises a message type table and information element tables, whereby the message type table has, for each message type, pointers to a respective information element table of the information element tables, which indicates whether information elements of a respective message type are mandatory or optional.

8. A program-controlled evaluation system, comprising:
   a first protocol for a message-oriented layer-3 communication between a communication switching installation and a peripheral installation of a communication device, and a second protocol for a message-oriented layer-3 communication between the communication switching installation and a terminal apparatus, via the peripheral installation, the peripheral installation being a base station for bidirectional conversion of wire-bound transmitted signals at one side of the switching installation, and wirelessly transmitted signals at one side of the terminal apparatus;
   each of the first and the second protocols having function blocks identified by protocol discriminators;
   the first and second protocols having protocol messages, each protocol message having a protocol discriminator indicator;
   a single main sequence control of function block-specific, table-controlled evaluation of the first and of the second protocols using protocol discriminator-dependent branching; and
   an evaluation system for the layer-3 communication between the peripheral installation of the communication switching installation and said base station, and a terminal apparatus that is wirelessly connectable via the base station.

9. The evaluation system according to claim 8, wherein the second protocol is a layer-3 protocol according to the Digital European Cordless Tele-communications standard ETS 300 175.

10. The evaluation system according to claim 8, wherein, when a message of the second protocol for a communication between the communication switching installation and the terminal apparatus is transmitted between the communication switching installation and the peripheral installation as a message element of the first protocol, the main sequence control is called first for evaluation of the message of the first protocol and is thereafter called for evaluation of the message of the second protocol.

11. The evaluation system according to claim 8, wherein the evaluation system further comprises a control installation and at least one memory installation for storing a main sequence control, for storing analysis and synthesis functions, for storing a protocol branching table containing all protocol discriminators as an entrance table, and for storing a database table for each protocol discriminator that respectively contains setup of all messages of an associated protocol function block, and to which there respectively points a pointer of the protocol branching table, in order to effect the protocol discriminator-dependent branching.

12. The evaluation system according to claim 11, wherein the memory installation has stored therein a message element table that indicates for each message element whether said message is mandatory or optional, said message a message element function table, which contains pointers to an analysis function and a synthesis function of individual message elements, and has stored therein a timer value table containing protocol-specific time values, whereby the individual database tables respectively contain pointers to message elements or, respectively, time values of the message element table, of the message element function table, and of the timer values table, which message elements or time values are required for each individual message setup.

13. The evaluation device according to claim 12, wherein the message element table comprises a message type table and information element tables, whereby the message type table has, for each message type, pointers to a respective information element table of the information element tables, which indicates whether information elements of a respective message type are mandatory or optional.

14. A program-controlled evaluation system for a message-oriented layer-3 communication between a communication switching installation and a peripheral installation of a communication device, using a first protocol, and for a message-oriented layer-3 communication between the communication switching installation and a terminal apparatus, using a second protocol via the peripheral installation, comprising:

each of the first and the second protocols having function blocks identified by protocol discriminators;

the first and second protocols having protocol messages, each protocol message having a protocol discriminator indicator;

a single main sequence control of function block-specific, table controlled evaluation of the first and of the second protocols using protocol discriminator-dependent branching; and a control installation and at least one memory installation for storing the main sequence control, for storing analysis and synthesis functions, for storing a protocol branching table containing all protocol discriminators as an entrance table, and for storing a database table for each protocol discriminator that respectively contains setup of all messages of an associated protocol function block, and to which there respectively points a pointer of the protocol branching table, in order to effect the protocol discriminator-dependent branching.

15. The evaluation system according to claim 14, wherein the memory installation has stored therein a message element table that indicates for each message element whether said message is mandatory or optional, said message a message element function table, which contains pointers to an analysis function and a synthesis function of individual message elements, and has stored therein a timer value table containing protocol-specific time values, whereby the individual database tables respectively contain pointers to message elements or, respectively, time values of the message element table, of the message element function table, and of the timer values table, which message elements or time values are required for each individual message setup.

16. The evaluation device according to claim 15, wherein the message element table comprises a message type table and information element tables, whereby the message type table has, for each message type, pointers to a respective information element table of the information element tables, which indicates whether information elements of a respective message type are mandatory or optional.

17. The evaluation system according to claim 14, wherein the peripheral installation is a base station for bidirectional conversion of wire-bound transmitted signals at one side of the switching installation, and wirelessly transmitted signals at one side of the terminal apparatus, and wherein the evaluation system for the layer-3 communication is provided between a peripheral assembly of the communication switching installation and said base station, and a terminal apparatus that is wirelessly connectable via this base station.

18. The evaluation system according to claim 14, wherein the second protocol is a layer-3 protocol according to the Digital European Cordless Telecommunications standard ETS 300 175.

19. The evaluation system according to claim 14, wherein, when a message of the second protocol for a communication between the communication switching installation and the terminal apparatus is transmitted between the communication switching installation and the peripheral installation as a message element of the first protocol, the main sequence control is called first for evaluation of the message of the first protocol and is thereafter called for evaluation of the message of the second protocol.

* * * * *